United States Patent
Anastas

(10) Patent No.: US 10,178,487 B2
(45) Date of Patent: *Jan. 8, 2019

(54) BINAURAL AUDIO SYSTEMS AND METHODS

(71) Applicant: Chris T. Anastas, Phoenix, AZ (US)

(72) Inventor: Chris T. Anastas, Phoenix, AZ (US)

(73) Assignee: SOUNDFI SYSTEMS, LLC, Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,445

(22) Filed: Apr. 14, 2015

(65) Prior Publication Data

US 2015/0296288 A1    Oct. 15, 2015

Related U.S. Application Data

(60) Provisional application No. 61/979,930, filed on Apr. 15, 2014, provisional application No. 62/102,390, filed on Jan. 12, 2015.

(51) Int. Cl.
*H04R 5/033* (2006.01)
*H04S 1/00* (2006.01)
(Continued)

(52) U.S. Cl.
CPC ............ *H04S 1/007* (2013.01); *G10L 19/018* (2013.01); *H04R 1/1041* (2013.01); *H04R 5/033* (2013.01);
(Continued)

(58) Field of Classification Search
CPC .............. H04R 1/1091; H04R 2499/11; H04R 1/1041; H04R 5/033; H04R 5/04;
(Continued)

(56) References Cited

U.S. PATENT DOCUMENTS

| 7,881,713 B2 | 2/2011 | Hale et al. |
| 7,995,770 B1 | 8/2011 | Simon |

(Continued)

FOREIGN PATENT DOCUMENTS

WO        2012114169        8/2012

OTHER PUBLICATIONS

Shane Thomas, International Search Report, PCT/US15/25745, filed Apr. 14, 2015.

(Continued)

*Primary Examiner* — Vivian C Chin
*Assistant Examiner* — Con P Tran
(74) *Attorney, Agent, or Firm* — Greenberg Traurig, LLP

(57) ABSTRACT

In order to achieve an enhanced audio experience, audio information, for example a movie soundtrack having binaural components, may be stored on a mobile device prior to the beginning of a movie presentation in a theater. Responsive to an audio sync signal presented to the mobile device, the audio information may be played back from the mobile device in a manner synchronized to display of the movie on a theater screen. The audio sync signal may be a high-frequency signal emitted by a loudspeaker in the theater. The audio information may be customized for a user. For example, via use of a binaural audio system, a user of a first mobile device may experience a movie presentation in a theater in a first language, and user of a second mobile device may experience the same movie presentation in the theater in a second language.

13 Claims, 5 Drawing Sheets

(51) Int. Cl.
*H04R 1/10* (2006.01)
*G10L 19/018* (2013.01)
*H04R 5/04* (2006.01)

(52) U.S. Cl.
CPC .............. *H04R 1/1075* (2013.01); *H04R 5/04* (2013.01); *H04S 2400/15* (2013.01)

(58) Field of Classification Search
CPC ... H04R 1/1075; H04S 1/007; H04S 2400/15; G10L 19/018
USPC .... 381/77, 17, 309, 300, 1, 26, 80, 74, 370, 381/182; 348/14.02; 455/151.2, 41.3, 455/464
See application file for complete search history.

(56) References Cited

U.S. PATENT DOCUMENTS

| | | |
|---|---|---|
| 8,495,236 B1 | 7/2013 | Glasser |
| 8,515,103 B2 | 8/2013 | Mei et al. |
| 8,634,030 B2 | 1/2014 | Hale et al. |
| 2006/0045294 A1* | 3/2006 | Smyth .................... H04S 7/304 381/309 |
| 2010/0104118 A1 | 4/2010 | Sasidharan et al. |
| 2010/0223062 A1* | 9/2010 | Srinivasan ............. G11B 20/10 704/500 |
| 2010/0302393 A1* | 12/2010 | Olsson ............... G06K 9/00228 348/222.1 |
| 2010/0322340 A1 | 12/2010 | Bohm |
| 2012/0095749 A1 | 4/2012 | Capretta |
| 2012/0308067 A1 | 12/2012 | Ip |
| 2013/0272672 A1 | 10/2013 | Padro Rondon et al. |
| 2013/0301392 A1* | 11/2013 | Zhao ..................... H04B 11/00 367/135 |
| 2014/0028914 A1 | 1/2014 | Polak et al. |
| 2014/0079241 A1 | 3/2014 | Chan et al. |
| 2014/0297815 A1 | 10/2014 | Rajapakse |

OTHER PUBLICATIONS

Shane Thomas, Written Opinion of the International Search Authority, PCT/US15/25745, filed Apr. 14, 2015.

\* cited by examiner

BINAURAL AUDIO SYSTEMS AND METHODS

CROSS-REFERENCE TO RELATED APPLICATIONS

This application claims priority to, and the benefit of, U.S. Provisional Application Ser. No. 61/979,930 entitled "BINAURAL SOUND CAPTURE AND MULTI-USER SYNCHRONIZED REPLAY" and filed Apr. 15, 2014. This application also claims priority to, and the benefit of, U.S. Provisional Application Ser. No. 62/102,390 entitled "BINAURAL AUDIO SYSTEMS AND METHODS" and filed Jan. 12, 2015. The entire contents of each of the foregoing applications are incorporated herein by reference.

TECHNICAL FIELD

The present disclosure generally relates to audio recording and playback, and more particularly to systems and methods for capturing and presenting synchronized audio, for example binaural audio.

BACKGROUND

Conventional audio capture and reproduction approaches have remained, at the core, largely unchanged for an extended period of time. Audio data is captured via one or more microphones, stored on or in a recording medium, and then played back via one or more loudspeakers. While such systems and related technologies have become increasingly ubiquitous, powerful, compact, and energy-efficient, they have generally not allowed for simultaneous mass customization of audio, nor have they allowed for expanded approaches for interaction with an audience. Accordingly, improved audio systems and/or tools remain desirable. For example, systems and methods capable of obtaining, delivering, and synchronizing binaural audio remain desirable.

SUMMARY

In an exemplary embodiment, a method for binaural audio presentation comprises receiving, at a mobile device, binaural audio information associated with an event; synchronizing, via an application operative on the mobile device, playback of the binaural audio information to the event; and playing back, via headphones coupled to the mobile device, the binaural information in synchronization with the event.

In another exemplary embodiment, a method for binaural audio presentation comprises receiving, at a mobile device and via a wireless data network, an audio track for a movie presented in a theater, the audio track encoded with binaural audio information; and receiving, at the mobile device, an audio sync signal emitted by a loudspeaker in the theater. The audio sync signal is configured to synchronize playback of the audio track to the movie, and the audio sync signal comprises only audio information having a frequency above 19000 Hz. The method further comprises playing back, via an application operative on the mobile device and responsive to the audio sync signal, the audio track synchronized to video content of the movie in the theater.

In another exemplary embodiment, a method for binaural audio presentation comprises delivering, to a first mobile device, a first binaural audio file associated with an event, the first binaural audio file including spoken words in a first language; delivering, to a second mobile device, a second binaural audio file associated with the event, the second binaural audio file including spoken words in a second language different from the first language; and synchronizing, via a signal delivered to the first mobile device and the second mobile device, playback of the first binaural audio file and the second binaural audio file to the event.

In another exemplary embodiment, a method for synchronization of audio playback comprises receiving, at an audio system of a theater, a synchronization file containing synchronization information for a movie; playing, via a loudspeaker of the audio system, conventional audio information for the movie; and playing, via the loudspeaker and simultaneous with playback of the conventional audio information, an audio sync signal derived from the synchronization file. The audio sync signal is configured to synchronize playback of processed audio data stored on a smartphone of a theater patron with the movie.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

Figure 1A:
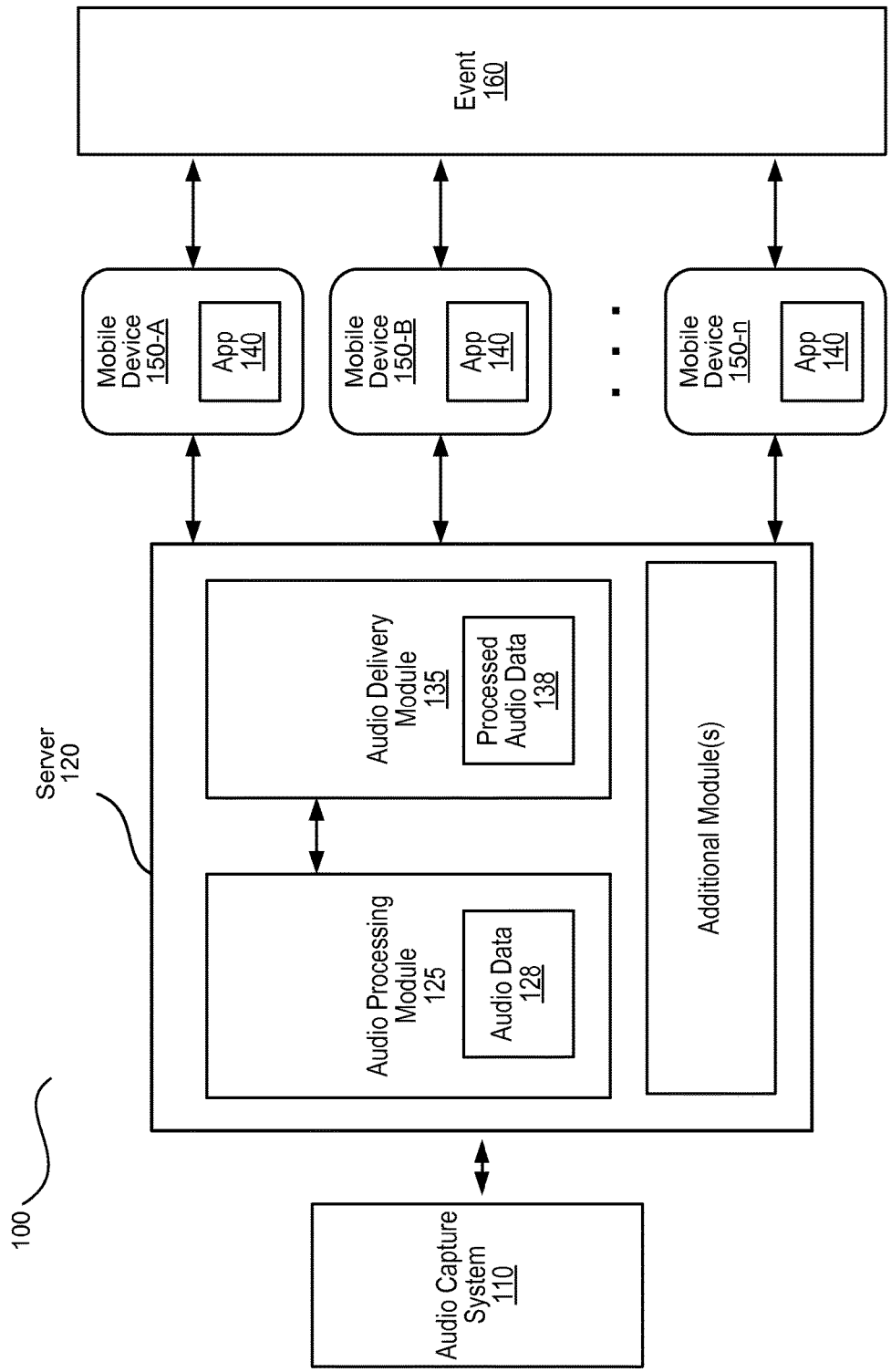
FIG. 1A is a block diagram illustrating components of an exemplary binaural audio system, together with related components, in accordance with various embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for audio recording, processing, playback, synchronization, and/or the like may not be described in detail herein. Furthermore, the connecting lines shown in various figures contained herein are intended to represent exemplary functional relationships and/or physical, electrical, communicative, or logical couplings between various elements. It should be noted that many alternative or additional components, relationships, or connections may be present in a practical binaural audio system.

Prior audio devices and systems suffer from various deficiencies. For example, theater-style surround sound systems offer only limited sound staging/sound localization capabilities due to incomplete sound isolation. For example, sound emanating from a loudspeaker on the left side of the theater will eventually reach both the left ear and the right ear of a moviegoer, with the sound arriving at the right ear after a slight delay as compared to the left ear. Binaural approaches delivered via headphones offer significantly improved sound staging/sound localization potential, but have proven difficult and/or impractical to implement. Accordingly, the audio portion of many audiovisual (A/V) entertainment forms remains subject to significant improvement.

In contrast, these and other shortcomings of prior approaches may be overcome by utilizing principles of the present disclosure, for example as illustrated in various exemplary embodiments. For example, by utilizing headphones in connection with audio data (for example, binaural audio data) delivered via a mobile device (for example, a smartphone), a moviegoer can experience a movie with lifelike or near-lifelike sound localization; stated another way, principles of the present disclosure facilitate creation and delivery of realistic three-dimensional audio, for example in a theater. Additionally, principles of the present disclosure facilitate increased audience and/or customer interaction with media-based entertainment, such as movies, television programs, and/or the like. In certain exemplary embodiments, principles of the present disclosure contemplate a moviegoing experience in "6-D" (three-dimensional video plus three-dimensional audio), allowing previously unobtainable levels of immersivity and consumer engagement.

Functionality of the present disclosure can partially or fully reshape the way consumers interact with entertainment, for example via movie theater attendance, or via viewing of live and/or prerecorded content on television, computer, mobile device, and/or the like. As used herein, a "binaural audio system" may be any system configured to facilitate recording, processing, delivery, and/or synchronized playback of audio data, and particularly binaural audio data; stated another way, principles of the present disclosure contemplate improved capabilities for sound staging, localization, and immersivity, including via customization and/or synchronization.

In various embodiments, exemplary binaural audio systems include a user interface ("UI"), software modules, logic engines, various databases, interfaces to external systems and tools, network communications capabilities, and/or the like. While exemplary binaural audio systems may contemplate upgrades or reconfigurations of existing software and/or electronic devices (for example, smartphones), changes to existing databases and system tools are not necessarily required by principles of the present disclosure.

Exemplary benefits provided by functionality of the present disclosure include, for example, increased consumer immersivity in and interactivity with media, increased customer goodwill, decreased media development expenses, increased language localization capabilities in connection with media presentation, and the like. For example, a moviegoer benefits from receiving audio presented in a more realistic manner and/or in a language preferred by the moviegoer. On the other hand, movie-industry organizations benefit from reduced expenses associated with recording and mixing of audio data associated with a movie, the ability to charge a premium price for an upgraded audio experience, the ability to more effectively target audience advertising, and so forth.

As will be appreciated by one of ordinary skill in the art, one or more binaural audio system 100 components may be embodied as a customization of an existing system, an add-on product, upgraded software, a distributed system, a method, a data processing system, a device for data processing, and/or a computer program product. Accordingly, individual binaural audio system 100 components may take the form of an entirely software embodiment, an entirely hardware embodiment, or an embodiment combining aspects of both software and hardware. Furthermore, individual binaural audio system 100 components may take the form of a computer program product on a non-transitory computer-readable storage medium having computer-readable program code means embodied in the storage medium. Any suitable computer-readable storage medium may be utilized, including magnetic storage devices (e.g., hard disks), optical storage devices, (e.g., DVD-ROM, CD-ROM, etc.), electronic storage devices (e.g., flash memory), and/or the like.

Exemplary systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, Flash, ActionScript, FLEX, VBScript, Macromedia Cold Fusion, COBOL, Microsoft Active Server Pages, assembly, PERL, SAS, PHP, awk, Python, Visual Basic, SQL Stored Procedures, PL/SQL, any UNIX shell script, and/or extensible markup language (XML) or the like, with the various algorithms being implemented with any combination of data structures, objects, processes, routines or other programming elements. Further, it should be noted that the system may employ any number of conventional techniques for data transmission, signaling, data processing, network control, or the like.

Software elements may be loaded onto a general purpose computer, special purpose computer, or other programmable data processing apparatus to produce a machine, such that the instructions that execute on the computer or other programmable data processing means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified herein or in flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, mobile applications, web sites, etc. Practitioners will appreciate that the illustrated steps described herein may comprise any number of configurations thereof. It should be further appreciated that the multiple steps as illustrated and described may be combined into single web pages, mobile application screens, and/or windows but have been expanded for the sake of simplicity. In other cases, steps illustrated and described as single process steps may be separated into multiple web pages, application screens and/or windows but have been combined for simplicity.

In various embodiments, components, modules, and/or engines of binaural audio system 100 may be implemented as mobile applications or "apps". Apps are typically deployed in the context of a mobile operating system, including for example, a Palm® mobile operating system, a Windows® mobile operating system, an Android® operating system, Apple® iOS, a Blackberry® operating system and the like. The app may be configured to leverage the resources of the larger operating system and associated hardware, for example via a set of predetermined rules which govern the operations of various operating systems and hardware resources. For example, where an app desires to communicate with a device or network other than the corresponding mobile device or mobile operating system, the app may leverage the communication protocol of the operating system and associated device hardware under the predetermined rules of the mobile operating system. Moreover, where the app desires an input from a user, the app may be configured to request a response from the operating system which monitors various hardware components and then communicates a detected input from the hardware to the app.

Figure 1B:
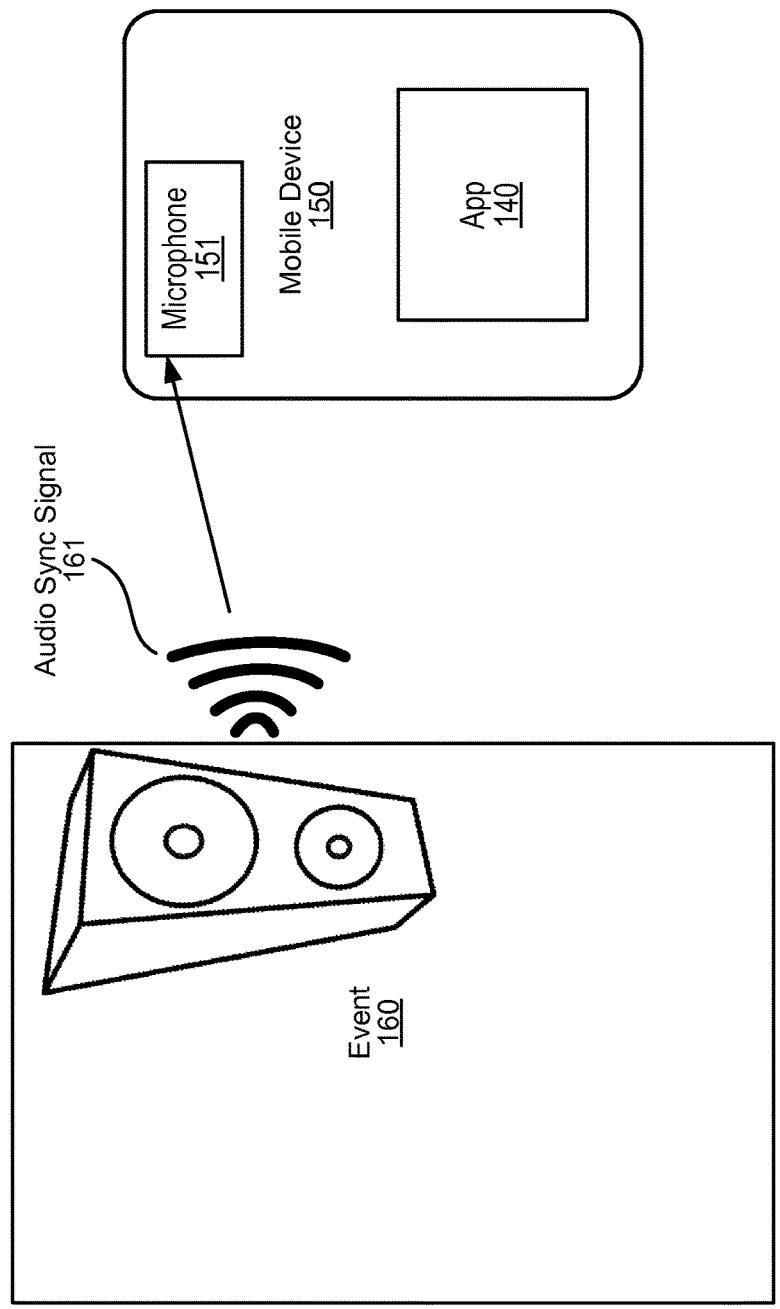
FIG. 1B illustrates synchronization of binaural audio playback with an event in accordance with various embodiments.

With reference now to FIGS. 1A and 1B, in an exemplary embodiment a binaural audio system 100 comprises a server 120 and an app 140. Binaural audio system 100 may receive audio data from an audio capture system 110, for example a microphone. App 140 may be operative on a mobile device 150. Binaural audio system 100 is configured to permit playback of binaural audio in connection with an event or events 160. It will be appreciated that binaural audio system 100 may be configured to support any number of mobile devices 150-A, 150-B, . . . , 150-*n*, simultaneously.

Audio capture system 110 may be any system or components configured to record and/or capture sounds. For example, audio capture system 110 may comprise a microphone coupled to a recording device, such as a computer. In various exemplary embodiments, audio capture system 110 comprises a Sennheiser MKE2002 microphone, a Neumann KU-100 microphone, or the like. Moreover, binaural audio system 100 may utilize any form of audio input (e.g., mono, stereo, and/or binaural), and is not limited to use of audio inputs having an inherent binaural component as recorded.

Server 120 may be any system or components configured to facilitate storage, processing, and transmittal of audio information, for example conventional networked computing resources as known in the art. Additionally, it is understood that a "server" or applications thereof may refer to or encompass cloud-based computing resources, applications, and/or services delivered over a network. For example, server 120 may comprise cloud-based storage and/or processing for audio data 128, for example audio data 128 obtained from audio capture system 110.

In various exemplary embodiments, server 120 is configured with an audio processing module 125. Audio processing module 125 is configured to process audio data 128 to create processed audio data 138. Processing may include creation or modification of a binaural effect, mixing, overlays, crossfades, synthesis, addition and/or subtraction of sounds, level adjustments, clipping, truncation, timbre, pitch, loudness, frequency, and/or any other suitable form of audio modification. In an exemplary embodiment, audio processing module 125 is configured to create (or facilitate creation of) processed audio data 138 in the form of a movie audio track containing binaural effects. Moreover, processed audio data 138 may be monaural, stereo, binaural, and/or otherwise comprise any suitable audio formats, encodings, and/or content.

In various exemplary embodiments, processed audio data 138 includes binaural audio information. Processed audio data 138 may also include synchronization information (timestamps, etc.), commands or operational instructions for app 140, and/or the like.

Processed audio data 138 may be stored, transmitted, transcoded, and/or played back in or between any suitable form, format, or codec, for example as a .WAV file, MPEG layer 2 (.mp2), layer 3 (.mp3), or layer 4 (.mp4) file, AAC, Vorbis OGG, Apple ALAC, FLAC, Windows Media, and/or the like. Processed audio data 138 may be compressed or uncompressed, encrypted and/or unencrypted, as desired. In some exemplary embodiments, processed audio data 138 is compressed for transmission to mobile device 150, and decompressed and/or transcoded on mobile device 150.

In various exemplary embodiments, server 120 is configured with an audio delivery module 135. Audio delivery module 135 is configured to deliver processed audio data 138 to mobile device 150 and thus to app 140. Audio delivery module 135 may be configured with various authentication, encryption, and/or access control components, as suitable, in order to ensure secure delivery of processed audio data 138 only to an authorized mobile device 150.

Event 160 may be any event having an audio component, for example a movie, a television program, a streaming media presentation, a facility tour, a sporting event, a theatrical play, and/or the like. It will be appreciated that, while the exemplary embodiments discussed herein focus primarily on application of principles of the present disclosure to movies presented in a cinema or theater, such principles are equally applicable to in-home viewing of content on a television, viewing of content on a tablet computer, etc. Additionally, as used herein, an "event" may also be considered to refer to certain capabilities of a venue wherein audiovisual information is presented, for example preinstalled loudspeakers and the like.

App 140 may be any software application suitable for execution on mobile device 150. In various exemplary embodiments, app 140 comprises an application for Apple iOS devices and/or Android devices. App 140 is configured to obtain processed audio data 138 from server 120. App 140 is also configured to play back processed audio data 138 in a synchronized manner in connection with an event 160.

In various exemplary embodiments, app 140 provides functionality to a user prior to binaural audio playback, during binaural audio playback, and after binaural audio playback. For example, app 140 is configured to provide functionality before a user enters a theater. For example, app 140 allows a user to retrieve movie listings, select showtimes, and purchase movie tickets. Because mobile network reception inside a theater is typically poor, and because bandwith therein is typically limited due to the large number of mobile devices in close proximity, app 140 may be configured to download processed audio data 138 associated with an event 160 prior to the start of event 160. In this manner, all processed audio data 138 associated with an event 160 may be stored on mobile device 150 and ready for playback via app 140 during the event 160. App 140 may provide download status indications, such as via a progress bar or numerical indicator. In certain embodiments, a portion of processed audio data 138 associated with an event 160 is pre-downloaded, and another portion of the processed audio data 138 is downloaded during the event 160.

Once a user has purchased a movie ticket, app 140 can send reminders about the upcoming show, and encourage the user to complete download of processed audio data 138 prior to entering the theater.

Once a user is in the theater, app 140 may welcome the user and provide information about the upcoming event 160. Additionally, app 140 may provide basic technical information about the operation of binaural audio system 100, and prompt the user to put on their headphones and prepare to experience binaural audio. The user may select a particular event 160 within a menu in app 140; alternatively, app 140 may automatically select an event 160, for example based on GPS information from mobile device 150, time information, nearby location beacons, and/or the like.

In certain exemplary embodiments, app 140 is configured to deliver binaural audio in a synchronized manner. Stated another way, playback of binaural audio via app 140 may be synchronized to event 160 or to another suitable synchronization target.

In an exemplary embodiment, app 140 is configured to sync binaural audio playback to event 160 via an audio sync signal 161 presented in connection with event 160. Audio sync signal 161 may be delivered via any suitable audible sound generation apparatus, but is preferably delivered via an existing loudspeaker implementation, for example loudspeakers preinstalled in a movie theater. This approach improves the technical capabilities and functioning of theater loudspeakers and associated control electronics, as it allows the theater loudspeakers to simultaneously deliver audio sync signal 161 together with conventional audio information for a movie.

Audio sync signal 161 may be encoded, for example into the conventional audio and/or video track of a movie, and played back via the theater loudspeakers. In one embodiment, audio sync signal 161 is encoded and/or delivered at a frequency or set of frequencies of between about 18 kHz and about 20 kHz, and preferably about 19 kHz. In this manner, the audio sync signal 161 may be unobtrusive and/or unnoticeable to theatergoers listening to the conventional audio track, while still being suitable for delivery and reception via conventional loudspeakers and microphones. In other exemplary embodiments, audio sync signal 161 is encoded and/or delivered at a frequency or set of frequencies of between about 2 Hz and about 120 Hz. In some exemplary embodiments, audio sync signal 161 is encoded and/or delivered at a frequency or set of frequencies of between about 120 Hz and about 18 kHz (in other words, a typical range of human hearing). In yet other exemplary embodiments, audio sync signal 161 is encoded and/or delivered at a frequency or set of frequencies of between about 20 kHz and about 25 kHz (i.e., above the range of typical human hearing). In some exemplary embodiments, audio sync signal 161 is delivered via a custom loudspeaker mounted to a theater ceiling and configured to deliver high-frequency signals above 20 kHz. Moreover, any frequency or range or set of frequencies may be utilized, as suitable, in order to form, encode, and/or deliver audio sync signal 161.

In various exemplary embodiments, in order to minimize and/or eliminate audience perception of the presence of audio sync signal 161, audio sync signal 161 may be presented at a level of between about −5 dB and about +10 dB in the mix (i.e., compared to other audio information emitted from the loudspeaker), and preferably at a level of about 0 dB in the mix. In various exemplary embodiments, audio sync signal 161 permits synchronization between binaural audio playback via app 140 and event 160 within an accuracy of about 1 millisecond or less.

In certain exemplary embodiments, audio sync signal 161 may be at least partially "masked" and/or concealed by conventional aspects of an audio presentation, for example a movie soundtrack delivered via loudspeakers in a theater. For example, audio sync signal 161 or portions thereof may be presented during portions of a soundtrack having loud and/or high-frequency content, for example gunshots, explosions, breaking glass, screams, and/or the like. It will be appreciated that audio sync signal 161 may be presented over various frequencies and/or at varying volumes, for example in order to remain unobtrusive when presented in connection with a movie soundtrack. Moreover, by presenting audio sync signal 161 at a louder volume when suitable, audio sync signal 161 may be more effectively delivered to mobile devices 150, particularly mobile devices 150 having lower-quality microphone components and/or microphone components having a limited range of sensitivity and/or frequency response.

Audio sync signal 161 is received at the mobile device 150, for example via a built-in microphone 151 typically utilized for voice calls, and is processed by app 140. Audio sync signal 161 may also be received via a microphone or microphones, such as an omnidirectional microphone, integrated into headphones connected to mobile device 150. App 140 utilizes audio sync signal 161 to synchronize playback of processed audio data 138 to event 160. Upon successful synchronization, app 140 may provide confirmation of audio sync to the user. Upon a synchronization error or series of errors, app 140 may provide an error message and suggest the user seek assistance from a theater representative.

Audio sync signal 161 may be repeated at a regular interval, as desired, in order to allow re-synchronization of processed audio data 138 as needed. For example, a theatergoer may exit a theater to purchase refreshments, make a telephone call, or utilize restroom facilities. After exiting the theater, playback of processed audio data 138 on a mobile device 150 may fall out of sync with the video portion of event 160; upon returning to the theater and thus returning to the presence of audio sync signal 161, app 140 may re-sync playback of processed audio data 138 at an appropriate temporal location. In an exemplary embodiment, audio sync signal 161 repeats over a five-second interval. In another exemplary embodiment, audio sync signal 161 repeats over a ten-second interval. In another exemplary embodiment, audio sync signal 161 repeats over a thirty-second interval. Moreover, any suitable interval may be selected, as desired, in order to allow prompt synchronization and/or resynchronization of audio playback between app 140 and event 160.

In various exemplary embodiments, audio sync signal 161 may be encoded utilizing multiple frequencies over time. For example, audio sync signal 161 may utilize various frequencies to represent and/or correspond to numbers and/or track identifiers. In one exemplary embodiment, audio sync signal 161 utilizes the following identifiers:

Track 1=19400 Hz
Track 2=19300 Hz
Track 3=19200 Hz
Track 4=19100 Hz
Number 0=19700 Hz
Number 1=19720 Hz
Number 2=19740 Hz
Number 3=19760 Hz
Number 4=19780 Hz
Number 5=19800 Hz
Number 6=19820 Hz
Number 7=19840 Hz
Number 8=19860 Hz
Number 9=19880 Hz
Number Repeat=19900 Hz
Time Stamp Marker=19950 Hz It will be appreciated that the foregoing identifiers may be emitted from a loudspeaker as a tone or series of tones having a corresponding frequency. In an exemplary embodiment, time stamp information in audio sync signal 161 is delivered as a 4 digit (front padded) number representing the number of seconds from the beginning of processed audio data 138 where playback should occur. In other exemplary embodiments, additional digits or fewer digits may be utilized. The digits may be sent in an order, for example from least significant digit to most significant digit. In an embodiment where audio sync signal 161 utilizes a 5 second repeat configuration, the time stamp is sent during the 5 second block as follows:

Second 1—send stamp 1
Second 2—send stamp 2
Second 3—send stamp 3
Second 4—send track frequency
Second 5—first 0.2 seconds transmit stamp marker. Final 0.8 seconds, transmit track frequency.

During the first three seconds, when stamps are sent, the following format may be used during each second:

First 0.2 seconds—track frequency
Second 0.2 seconds—frequency representing time digit 1
Third 0.2 seconds—frequency representing time digit 2
Fourth 0.2 seconds—frequency representing time digit 3
Fifth (final) 0.2 seconds—frequency representing time digit 4

If 2 consecutive digits in a time value are the same, a repeat frequency may be used to represent the second digit in the repeating pair. If three consecutive digits are the same, the standard digit frequency is used to represent the third digit in the repeated triple. For example, if time digits 2, 3, and 4 each have a numerical value of 5, a corresponding portion of audio sync signal 161 would be encoded with a frequency of 19800 Hz to represent time digit 2 having a value of 5, a frequency of 19900 Hz to represent time digit 3 having a value of 5, and a frequency of 19800 Hz to represent time digit 4 having a value of 5. In this manner, repeated digits may be effectively identified and communicated, without confusion as to when a digit begins and ends.

In various exemplary embodiments, binaural audio system 100 is configured to account for, compensate for, and/or adjust or correct synchronization differences or delays between playback of processed audio data 138 on mobile device 150 and local audio delivered via a theater loudspeaker. For example, a certain mobile device 150 utilizing an Android brand operating system may have a playback delay differing from a mobile device 150 utilizing an iOS operating system; stated another way, differences in mobile device 150 hardware and/or software can and do affect the timing of playback of processed audio data 138 stored thereon. When playback from mobile device 150 via headphones 155 is slightly out of sync, for example with a corresponding conventional movie soundtrack delivered via theater loudspeakers, an unpleasant "echo"-like effect may be perceptible to the listener, even through large and/or well-isolated headphones.

Accordingly, processed audio data 138 may be configured with customization information to cancel out, buffer, and/or otherwise correct for differences between playback via app 140 and local audio presented in a theater. For example, for a particular movie, binaural audio system 100 may deliver a first file of processed audio data 138 to an Android device, and a second file of processed audio data 138 to an iOS device; differences between the files can reflect variations in playback speeds, delays, etc., processing instructions for app 140, and/or any other suitable adjustments or commands for ensuring playback of processed audio data 138 on a particular mobile device 150 remains in sync.

In certain exemplary embodiments, app 140 may be configured to alter and/or adjust the rate of playback of processed audio data 138, for example depending on a characteristic of mobile device 150, in order to become synchronized with (and/or remain in synchronization with) local audio and/or presentation of visual data. Moreover, in various exemplary embodiments, in addition to inclusion of audio sync signal 161, audio information presented by theater loudspeakers may include various beacons, timestamps, and/or the like, to facilitate fine-tuning and/or other adjustments to synchronization and/or playback. For example, in an exemplary embodiment, the audio information presented by theater loudspeakers includes a high-frequency test or "heartbeat" tone presented on a repeating basis, for example every 60 seconds from the beginning of a movie. App 140 detects the heartbeat tone and compares the timing of this received tone to the current location of playback of processed audio data 138. For example, app 140 may detect the beginning of a heartbeat tone (representing a 60 second interval) at a point when app 140 has only played back 59.9 seconds of processed audio data 138 since the beginning of the last heartbeat tone. App 140 may utilize this discrepancy to adjust the position and/or rate of playback of processed audio data 138. Other suitable approaches for time-stamping and/or correcting synchronization issues may also be desirably employed, as needed, in order to avoid unpleasant echo or other de-synchronized audio artifacts.

In addition to audio synchronization between app 140 and event 160, audio sync signal 161 may also contain commands or instructions to app 140, for example instructions to activate or deactivate features or capabilities of mobile device 150, instructions to raise or lower playback volume, and/or the like. In this manner, audio sync signal 161 may be utilized to further refine and/or customize the experience for a user of app 140.

In other exemplary embodiments, app 140 is configured to sync binaural audio playback to event 160 via a local radio frequency (RF) signal, for example a signal transmitted from an RF transmitter associated with or linked to a movie projector. The local RF signal is received at mobile device 150 and is utilized by app 140 for synchronization and/or commands, in a manner analogous to how audio sync signal 161 may be utilized.

In yet other exemplary embodiments, app 140 is configured to sync binaural audio playback to event 160 via a mobile network carrier connection to a synchronization server. This may occur via a global time synchronization signal (network time signal) delivered by a mobile network carrier to mobile device 150, via a time synchronization handshake between mobile device 150 and server 120 or other server, or via any other suitable network-based synchronization method.

In still other exemplary embodiments, app 140 is configured to sync binaural audio playback to event 160 via synchronization signals delivered to mobile device 150 via infrared light, for example infrared light emitted from and/or modulated by an infrared light source disposed on the ceiling of a theater.

In addition to synchronization capabilities, in various exemplary embodiments app 140 is configured to support processed audio data 138 in multiple audio languages. In other words, app 140 is configured to allow a first mobile device 150-A to play back binaural audio in a first language in connection with an event 160, while a second mobile device 150-B plays back binaural audio in a second language in connection with the same event 160. Stated another way, app 140 permits moviegoers, in the same theater, to watch a movie in multiple languages at the same time. Thus, a cinema can accommodate moviegoers speaking various languages to each experience a movie presentation in their preferred language, simultaneously.

App 140 is also configured to support simultaneous playback of processed audio data 138 for users in different physical locations. For example, in connection with a live sporting event, users of app 140 distributed across the country may receive associated processed audio data 138, and each app 140 may play back the processed audio data 138 in synchronization with the live sporting event.

In one exemplary embodiment, app 140 supports multiple language capabilities via downloading of processed audio data 138. For example, a first user utilizing app 140 may select "English" for a particular download of processed audio data 138 associated with an event 160, and the selected processed audio data 138 is subsequently downloaded to mobile device 150 of the first user. A second user of app 140 may select "Spanish" for processed audio data 138 associated with the same event 160, and that user receives corresponding processed audio data 138 at his or her mobile device 150. A third user of app 140 may select "Mandarin" and receive corresponding processed audio data 138 at his or her mobile device 150, and so forth. During event 160, the first user listens to the English track, the second user listens to the Spanish track, the third user listens to the Mandarin track, and so forth. Any number of languages may be supported, as desired, for example via preparation of corresponding processed audio data 138 for each language.

In addition to enabling synchronization of binaural audio, and enabling simultaneous multi-language functionality, binaural audio system 100 may be configured to support and/or facilitate various interactive, marketing, personalization, localization, and/or commerce capabilities. For example, in various exemplary embodiments, app 140 is configured to implement one or more interactive activities associated with playback of a particular item of media, such as a movie. In one exemplary embodiment, app 140 is configured to implement "scared selfie" functionality. As a movie presentation approaches a particular scene or timestamp, via audible, tactile, and/or visual prompting from app 140, the user is prompted to hold mobile device 150 such that the user is looking both at the movie screen and the mobile device screen. The prompt may be through on-screen instructions displayed via app 140, via content in the movie, via vibration of mobile device 150, or via any other suitable method or combinations thereof. At a precise moment in the film, for example a particularly shocking or unexpected moment, app 140 displays a bright white screen on mobile device 150 to increase local illumination of the user's face, and takes a photo of the user via a front-facing camera of mobile device 150. The resulting "scared selfie" photograph can be stored or shared, for example via social media integration in app 140 or via conventional capabilities of mobile device 150.

Additionally, in some exemplary embodiments app 140 is configured with rating and/or feedback capabilities. For example, app 140 may be configured with social media integration to allow a user to share and/or comment on the experience of viewing a movie in connection with binaural audio system 100. App 140 may also permit a user to rate the movie, or provide comments to a director or movie studio. In various exemplary embodiments, app 140 is connected via an application programming interface (API) to one or more of Fandango, IMDB, RottenTomatoes, or the like in order to facilitate sharing of feedback or ratings.

In various exemplary embodiments, app 140 is configured to support "push" notifications. For example, app 140 may be configured to display messages or offers localized for a particular theater or event. Additionally, app 140 may be configured to display in-app advertising, for example advertising targeted based on user demographics, location, gender, age, residential information, media viewing history, ratings, and so forth. In this manner, app 140 facilitates improved monetization of a customer while the customer is at the theater or otherwise at a location or time where a purchase is likely.

In certain exemplary embodiments, app 140 is configured to support coupon functionality. For example, after viewing an event 160 such as a movie, a user of app 140 may be presented with offers for nearby restaurants or services. The offers may be tailored, for example based on GPS or accelerometer information from corresponding mobile device 150.

In some exemplary embodiments, app 140 offers in-app purchase functionality. For example, in addition to being able to purchase synchronized binaural audio associated with an event 160, a user may be able to purchase various other audio content, such as binaural beats for brainwave entrainment (also known as "i-dosing"). A user may also be able, via app 140, to place an order or pre-order for concessions or other refreshments from a theater, enabling faster-moving concessions lines or even direct delivery to the user's seat in the theater.

In various exemplary embodiments, app 140 offers biofeedback and/or biomonitoring capabilities. For example, app 140 may be configured to utilize sensors of mobile device 150 or linked thereto (for example, a linked smartwatch, fitness band, and/or the like), for example a heart rate sensor, thermometer, accelerometer, and/or the like, in order to evaluate a user's physical response to playback of processed audio data 138. App 140 may further modify processed audio data 138, for example by varying a volume level or selecting a branching storyline of an audio/visual presentation, responsive to the user's physical response.

Figure 2:
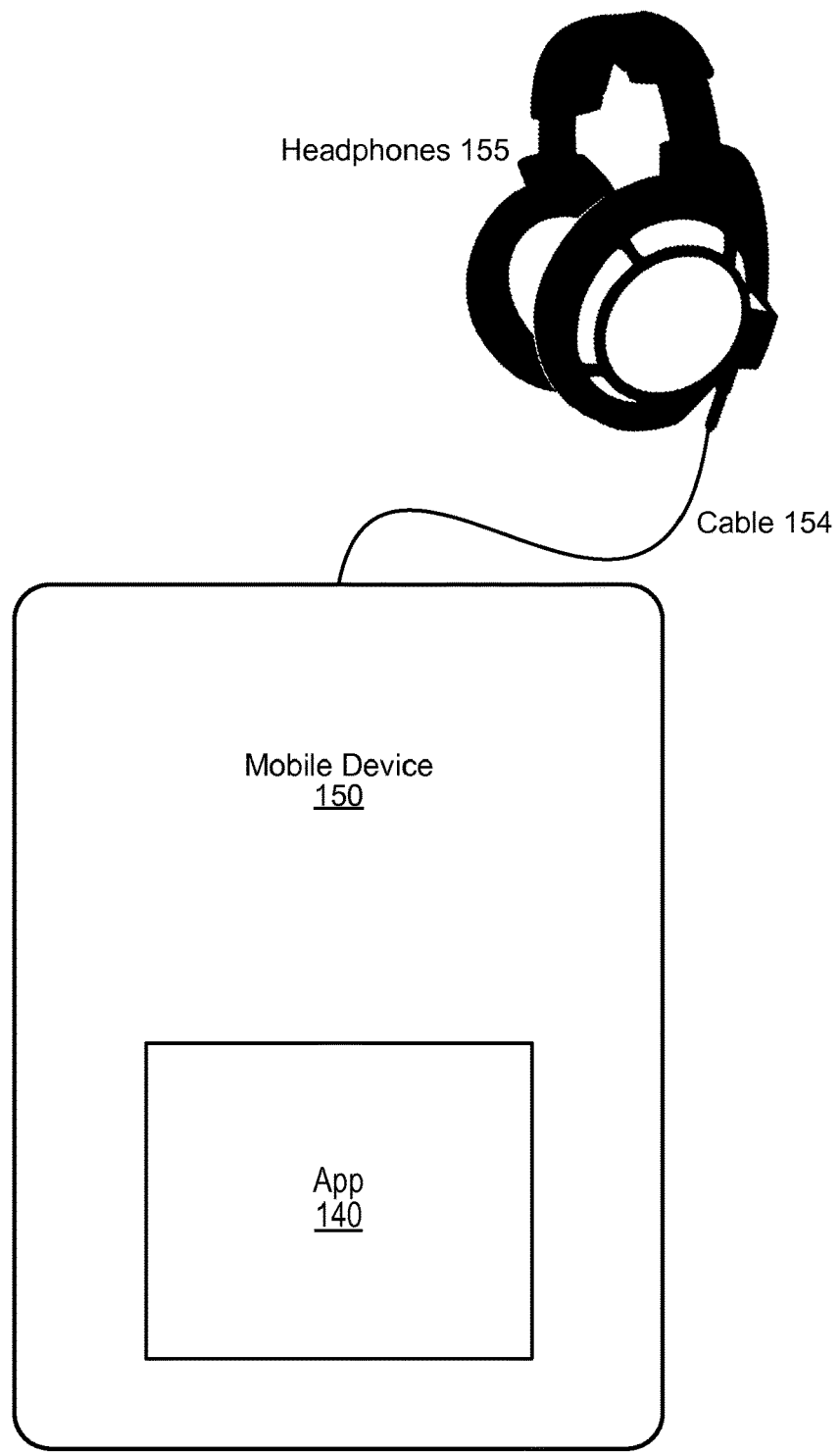
FIG. 2 illustrates components for binaural audio reception, storage, and playback in accordance with various embodiments.
Figure 3:
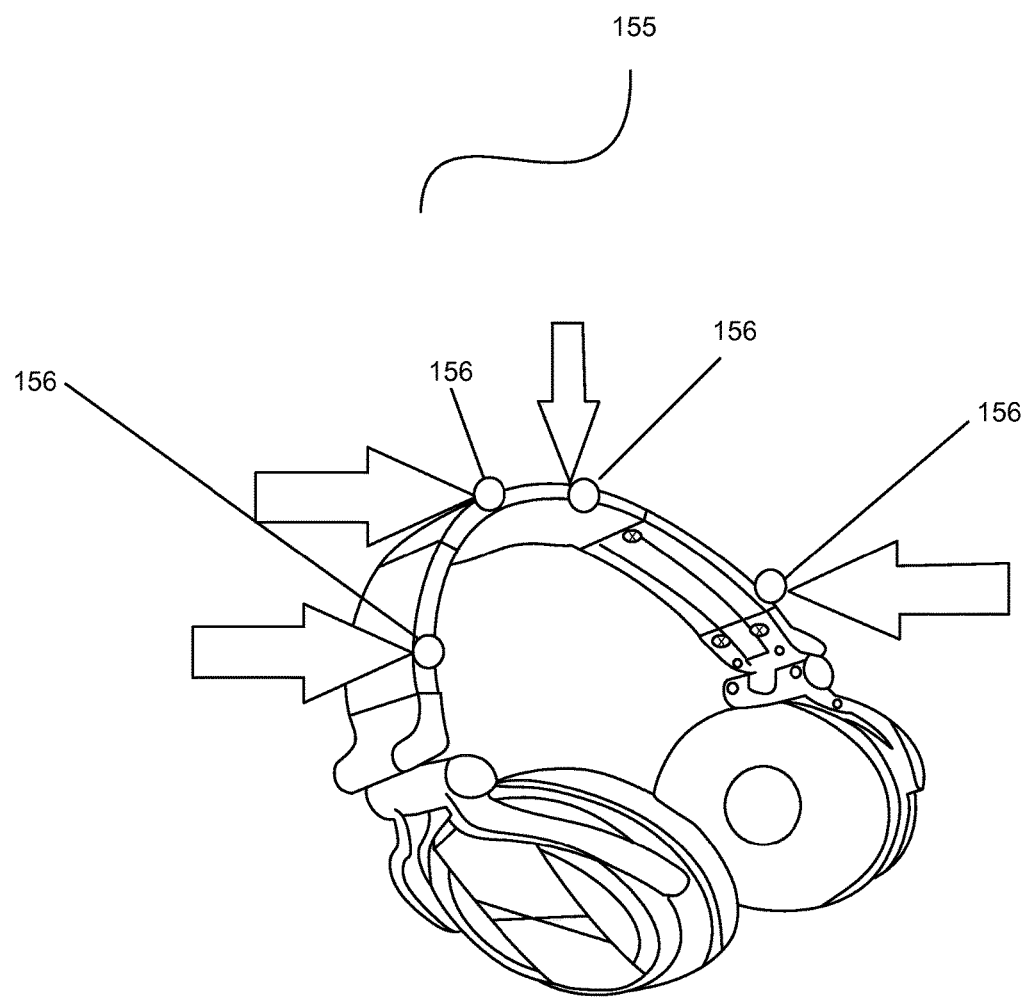
FIG. 3 illustrates exemplary headphones configured with microphones thereon in accordance with various embodiments.

With reference now to FIGS. 2 and 3, in various exemplary embodiments, mobile device 150 comprises one or more of a smartphone (for example, a smartphone capable of running one or more of an Apple iOS mobile operating system, an Android mobile operating system, a Windows Mobile operating system, and/or the like), a tablet computer, a laptop computer, a personal digital assistant, and/or the like. Mobile device 150 may also include or comprise wearable devices such as a smart watch, computing and/or sensing devices paired with a smartphone (for example, via Bluetooth), and/or the like.

Headphones 155 may comprise any suitable personal loudspeaker system suitable for playback of binaural audio. In various exemplary embodiments, headphones 155 may comprise on-ear, over-the ear, or in-ear headphones. Headphones 155 may be coupled to mobile device 150 via a cable 154; alternatively, headphones 155 may be coupled to mobile device 150 via a short-range wireless connection, for example Bluetooth or the like. In various exemplary embodiments, headphones 155 desirably comprise dipolar inverted drivers having a diameter of 50 mm or more, in order to present binaural audio effects of heightened accuracy and precision.

Cable 154 may comprise any cable suitable for conveying binaural audio data between mobile device 150 and headphones 155. In various exemplary embodiments, cable 154 comprises a standard 3.5 mm (⅛") audio cable. In other exemplary embodiments, for example embodiments wherein two-way communication and/or control between mobile device 150 and headphones 155 is implemented, cable 154 may comprise a Universal Serial Bus (USB)-compatible cable, an Apple Lightning® compatible cable, or other suitable communications cable.

In some exemplary embodiments, headphones 155 are configured with advanced functionality, for example headphone mounted microphone(s) 156, vibration capability, and/or the like. Headphone mounted microphone(s) 156 may be desirable in order to ensure clear reception of audio sync signal 161, particularly when mobile device 150 is stored in a pocket, case, purse, or otherwise in a position where audio sync signal 161 may have difficulty reaching mobile device 150. In one exemplary embodiment, headphones 155 comprise four (4) headphone mounted microphones 156, disposed on the sides and top of headphones 155 as illustrated in FIG. 3. In this exemplary embodiment, the headphone mounted microphones 156 are wired in series and coupled and grounded to mobile device 150 as a single microphone input. However, any suitable number of microphones may be utilized in any suitable locations, as desired.

In certain exemplary embodiments, app 140 is configured to control and/or communicate with headphones 155, for example in order to activate vibration capabilities or other advanced features.

Figure 4:
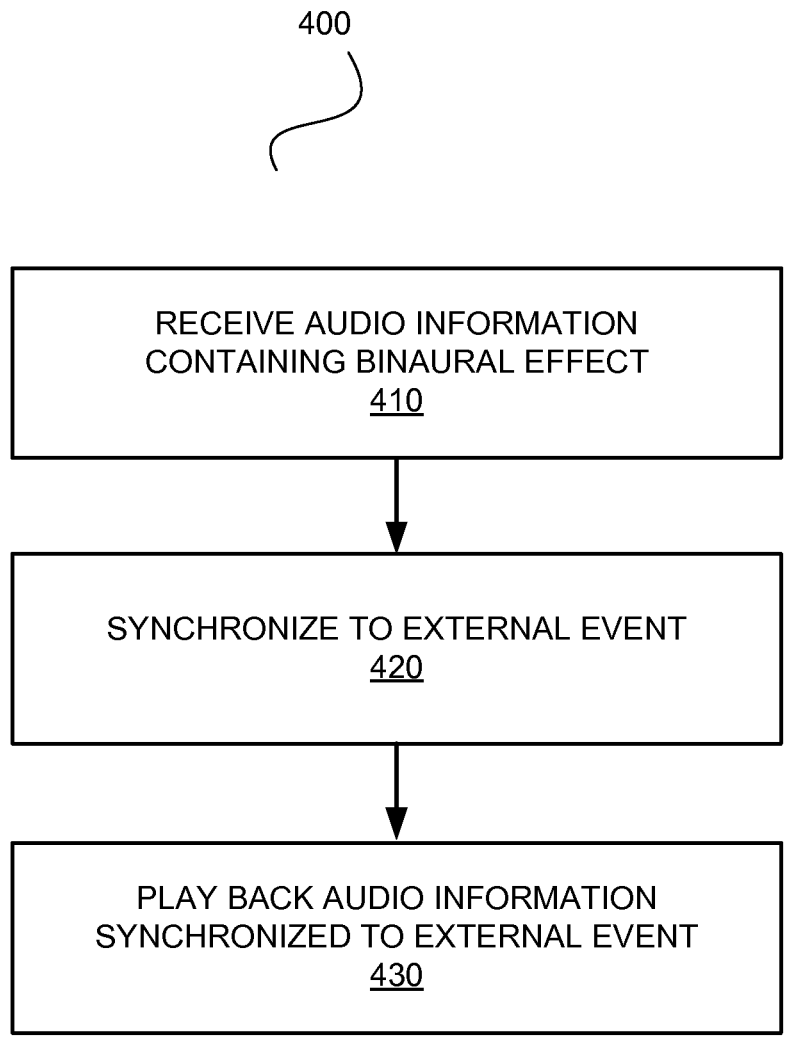
FIG. 4 illustrates a method for binaural audio presentation in accordance with various exemplary embodiments.

In an exemplary embodiment, with reference now to FIG. 4, a method 400 for binaural audio presentation comprises receiving, at a mobile device, audio information containing a binaural effect (step 410); synchronizing, to an external event, playback of the audio information (step 420); and playing back the audio information via headphones coupled to the mobile device (step 430).

In addition to the exemplary embodiments described above, it will be appreciated that binaural audio concepts and related synchronization capabilities may be deployed in a variety of applications. For example, an audio synchronization signal may be delivered via the SAP channel of a television broadcast, in order to synchronize playback of locally stored binaural audio information. Additionally, synchronized binaural audio may be presented in connection with an interactive amusement park ride, museum tour, and/or the like. Yet further, synchronized binaural audio may be captured and/or played back in connection with sporting events, for example binaural audio obtained from the inside of a race car during a race and transmitted to race viewers for synchronized local playback.

While the exemplary embodiments described herein are described in sufficient detail to enable those skilled in the art to practice principles of the present disclosure, it should be understood that other embodiments may be realized and that logical and/or functional changes may be made without departing from the spirit and scope of the present disclosure. Thus, the detailed description herein is presented for purposes of illustration and not of limitation.

While the description references specific technologies, system architectures and data management techniques, practitioners will appreciate that this description is of various embodiments, and that other devices and/or methods may be implemented without departing from the scope of principles of the present disclosure. Similarly, while the description references a user interfacing with the system via a computer user interface, practitioners will appreciate that other interfaces may include mobile devices, kiosks and handheld devices such as mobile phones, smart phones, tablet computing devices, etc.

While the steps outlined herein represent exemplary embodiments of principles of the present disclosure, practitioners will appreciate that there are any number of computing algorithms and user interfaces that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating exemplary embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for binaural audio presentation, the method comprising:
receiving, at a mobile device, binaural audio information associated with an event; synchronizing, via an application operative on the mobile device, playback of the binaural audio information to the event; and
playing back, via headphones coupled to the mobile device, the binaural audio information in synchronization with the event based on an audio sync signal,
wherein the audio sync signal encodes a series of tones representing an audio offset value for synchronizing the binaural audio information, and wherein the series of tones utilize different frequencies to represent consecutive identical digits in the audio offset value and a standard repeat marker frequency representing a second repeat digit of any continuous sequence of three identical digits; and
wherein the synchronizing is accomplished via the audio sync signal emitted from loudspeakers in a venue for the event and received at a microphone of the mobile device, and wherein a rate of playback of the binaural audio information depends at least in part on a characteristic of the mobile device.

2. The method of claim 1, further comprising re-synchronizing, responsive to the mobile device leaving the range of the audio sync signal and then returning to the range of the audio sync signal while the event is in progress, playback of the binaural audio information to the event.

3. The method of claim 1, wherein the audio sync signal comprises binaural audio information having a frequency above 18 kHz.

4. The method of claim 1, wherein the audio sync signal is received by multiple microphones incorporated into the headphones.

5. The method of claim 1, wherein the event is a motion picture presented in a theater.

6. The method of claim 1, further comprising activating, via the application, a vibration capability in the headphones at a specific time during the event.

7. The method of claim 1, further comprising capturing, via a camera of the mobile device, an image of a user of the mobile device at a specific time during the event.

8. The method of claim 1, wherein the binaural audio information is received at the mobile device prior to the beginning of the event.

9. A method for binaural audio presentation, the method comprising:
receiving, at a mobile device and via a wireless data network, an audio track for a movie presented in a theater, the audio track encoded with binaural audio information;
receiving, at the mobile device, an audio sync signal and a high-frequency test or "heartbeat" tone emitted by a loudspeaker in the theater, the audio sync signal configured to synchronize playback of the audio track to the movie, wherein the audio sync signal comprises audio information having a frequency above 19000 Hz; and
playing back, via an application operative on the mobile device and responsive to the audio sync signal, the audio track synchronized to video content of the movie in the theater, wherein the audio sync signal encodes a series of tones representing an audio offset value for synchronizing the binaural audio information, and wherein the series of tones utilize different frequencies to represent consecutive identical digits in the audio offset value; and
wherein the high-frequency test or "heartbeat" tone comprises a beacon or timestamp configured and arranged to facilitate adjustments to synchronization and/or playback
the synchronizing being accomplished via the audio sync signal emitted from the loudspeaker and received at a microphone of the mobile device where a rate of playback of the audio information depends at least in part on a characteristic of the mobile device.

10. A method for binaural audio presentation, the method comprising:
delivering, to a first mobile device, a first binaural audio file associated with an event, the first binaural audio file including spoken words in a first language;
delivering, to a second mobile device, a second binaural audio file associated with the event, the second binaural audio file including spoken words in a second language different from the first language; and
synchronizing, via an audio sync signal delivered to the first mobile device and the second mobile device, playback of the first binaural audio file and the second binaural audio file to the event wherein a rate of playback of the audio files depends at least in part on a characteristic of either of the first or second mobile device,
wherein the audio sync signal encodes a series of tones representing an audio offset value for synchronizing the binaural audio information, and wherein the series of tones utilize different frequencies to represent consecutive identical digits in the audio offset value and a standard repeat marker frequency representing a second repeat digit of any continuous sequence of three identical digits.

11. A method for synchronization of audio playback, the method comprising:
receiving, at an audio system of a theater, a synchronization file containing synchronization information for a movie;
playing, via a loudspeaker of the audio system, conventional audio information for the movie; and
playing, via the loudspeaker and simultaneous with playback of the conventional audio information, a high-frequency test or "heartbeat" tone and an audio sync signal derived from the synchronization file, the audio sync signal configured to synchronize playback of processed audio data stored on a smartphone of a theater patron with the movie, wherein the audio sync signal encodes a series of tones representing an audio offset value for synchronizing binaural audio information, and wherein the series of tones utilize different frequencies to represent consecutive identical digits in the audio offset value; and
wherein the high-frequency test or "heartbeat" tone comprises a beacon or timestamp configured and arranged to facilitate adjustments to synchronization and/or
playback.

12. A method for binaural audio presentation, the method comprising:
receiving, at a mobile device, binaural audio information associated with an event; synchronizing, via an application operative on the mobile device, playback of the binaural audio information to the event; and playing back, via headphones coupled to the mobile device, the binaural audio information in synchronization with the event based on an audio sync signal, wherein the audio sync signal encodes a series of tones representing an audio offset value for synchronizing the binaural audio information, and wherein the series of tones utilize different frequencies to represent consecutive identical digits in the audio offset value and a standard repeat marker frequency representing a second repeat digit of any continuous sequence of three identical digits; and wherein the synchronizing is accomplished via an audio sync signal emitted from loudspeakers in a venue for the event and received at a microphone of the mobile device, and wherein a rate of playback of the audio information depends at least in part on a characteristic of the mobile device; and further comprising re-synchronizing, responsive to the mobile device leaving the range of the audio sync signal and then returning to the range of the audio sync signal while the event is in progress, playback of the binaural audio information to the event; and wherein the audio sync signal comprises audio information having a frequency above 18 kHz; and wherein the audio sync signal is received by multiple microphones incorporated into the headphones; and wherein the event is a motion picture presented in a theater; and further comprising activating, via the application, a vibration capability in the headphones at any specific time during the event; and wherein the binaural audio information is received at the mobile device prior to the beginning of the event.

13. The method of claim 12, further comprising capturing, via a camera of the mobile device, an image of a user of the mobile device at any specific time during the event.

* * * * *